US012746886B2

(12) United States Patent
Jang

(10) Patent No.: US 12,746,886 B2
(45) Date of Patent: Sep. 29, 2026

(54) SIDE AIRBAG DEVICE

(71) Applicant: HYUNDAI MOBIS CO., LTD., Seoul (KR)

(72) Inventor: Rae Ick Jang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 19/098,343

(22) Filed: Apr. 2, 2025

(65) Prior Publication Data

US 2026/0054681 A1 Feb. 26, 2026

(30) Foreign Application Priority Data

Aug. 22, 2024 (KR) ........................ 10-2024-0112485
Aug. 22, 2024 (KR) ........................ 10-2024-0112486

(51) Int. Cl.

*B60R 21/231* (2011.01)
*B60R 21/207* (2006.01)
*B60R 21/2338* (2011.01)
*B60R 21/235* (2006.01)

(52) U.S. Cl.

CPC ...... *B60R 21/23138* (2013.01); *B60R 21/207* (2013.01); *B60R 21/2338* (2013.01); *B60R 2021/23146* (2013.01); *B60R 2021/23538* (2013.01)

(58) Field of Classification Search

CPC ............ B60R 21/23138; B60R 21/207; B60R 21/2338; B60R 2021/23146
See application file for complete search history.

(56) References Cited

U.S. PATENT DOCUMENTS

| | | | | |
|---|---|---|---|---|
| 7,988,188 | B2 * | 8/2011 | Zauritz | B60R 21/239 280/736 |
| 10,974,686 | B2 * | 4/2021 | Moon | B60R 21/207 |
| 11,091,114 | B2 * | 8/2021 | Komura | B60R 21/23138 |
| 11,155,232 | B2 * | 10/2021 | Moon | B60R 21/2338 |
| 11,407,375 | B2 * | 8/2022 | Lee | B60R 21/207 |
| 11,407,376 | B2 * | 8/2022 | Moon | B60R 21/23138 |
| 11,505,158 | B2 * | 11/2022 | Choi | B60R 21/2338 |
| 11,661,026 | B2 * | 5/2023 | Jo | B60R 21/23138 280/730.2 |
| 11,731,576 | B2 * | 8/2023 | Fuma | B60R 21/207 280/729 |
| 11,807,166 | B2 * | 11/2023 | Deng | B60R 21/2338 |

(Continued)

FOREIGN PATENT DOCUMENTS

| | | | | |
|---|---|---|---|---|
| CN | 117984936 A * | 5/2024 | | B60R 21/235 |
| DE | 102021100015 A1 * | 7/2021 | | B60N 2/427 |

(Continued)

OTHER PUBLICATIONS

KR-20220046939-A (machine translation) (Year: 2022).*

(Continued)

*Primary Examiner* — Minnah L Seoh
*Assistant Examiner* — Joselynn Y Sliteris
(74) *Attorney, Agent, or Firm* — NSIP Law

(57) ABSTRACT

A side airbag device for a seatback of a vehicle is provided. The side airbag device includes an airbag cushion for deployment between a driver seat and a passenger seat, and a mount provided in a rear end portion of the airbag cushion and installed in the seatback. The airbag cushion may include one or more inactive regions.

8 Claims, 12 Drawing Sheets

(56) References Cited

U.S. PATENT DOCUMENTS

| | | | | | |
|---|---|---|---|---|---|
| 11,814,004 | B2 * | 11/2023 | Hwangbo | ............. | B60R 21/233 |
| 11,820,313 | B2 * | 11/2023 | Yamamoto | ............ | B60R 21/207 |
| 12,202,426 | B2 * | 1/2025 | Azuma | ............. | B60R 21/23138 |
| 12,269,412 | B2 * | 4/2025 | Moon | ................. | B60R 21/2346 |
| 12,291,162 | B2 * | 5/2025 | Takasawa | ........... | B60R 21/2338 |
| 12,447,920 | B2 * | 10/2025 | Kobayashi | ........ | B60R 21/23138 |
| 2024/0208451 | A1 * | 6/2024 | Takasawa | ............. | B60R 21/237 |
| 2025/0074350 | A1 * | 3/2025 | Moon | ................. | B60R 21/2346 |

FOREIGN PATENT DOCUMENTS

| | | | | | | |
|---|---|---|---|---|---|---|
| EP | 3808611 | A1 | * | 4/2021 | ........... | B60R 21/239 |
| KR | 20220046939 | A | * | 4/2022 | ......... | B60R 21/2338 |
| KR | 20240157414 | A | * | 11/2024 | ....... | B60R 21/23138 |

OTHER PUBLICATIONS

CN-117984936-A (machine translation) (Year: 2024).*
KR-20240157414-A (machine translation) (Year: 2024).*
DE-102021100015-A1 (machine translation) (Year: 2021).*

* cited by examiner

[FIG. 1]
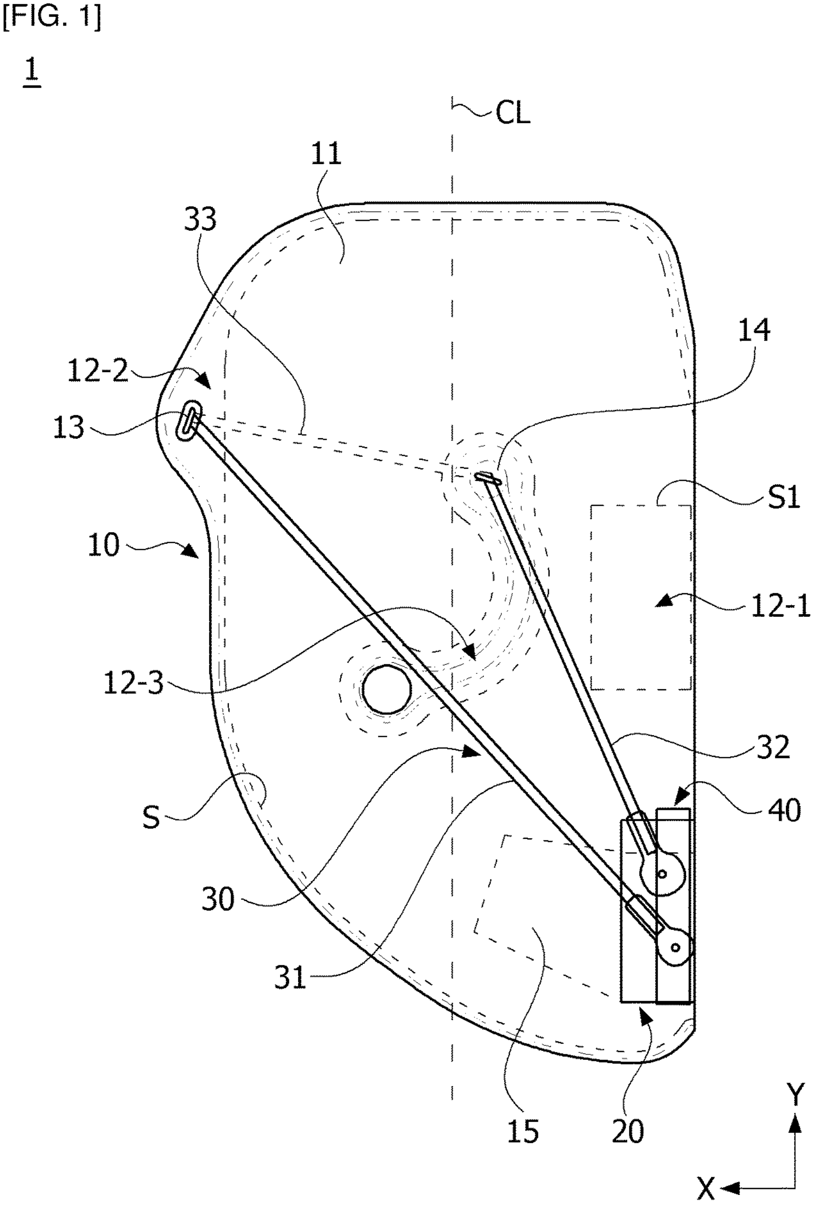

[FIG. 2]
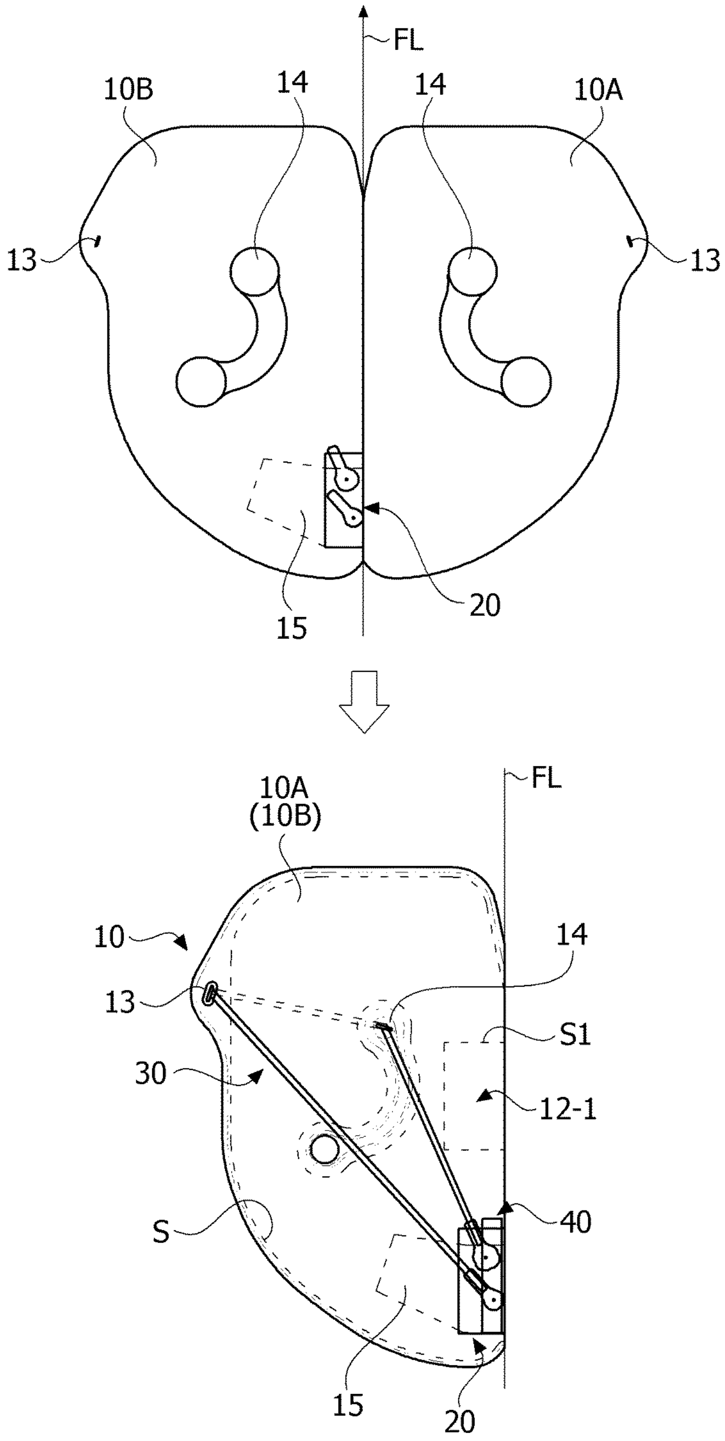

[FIG. 3]
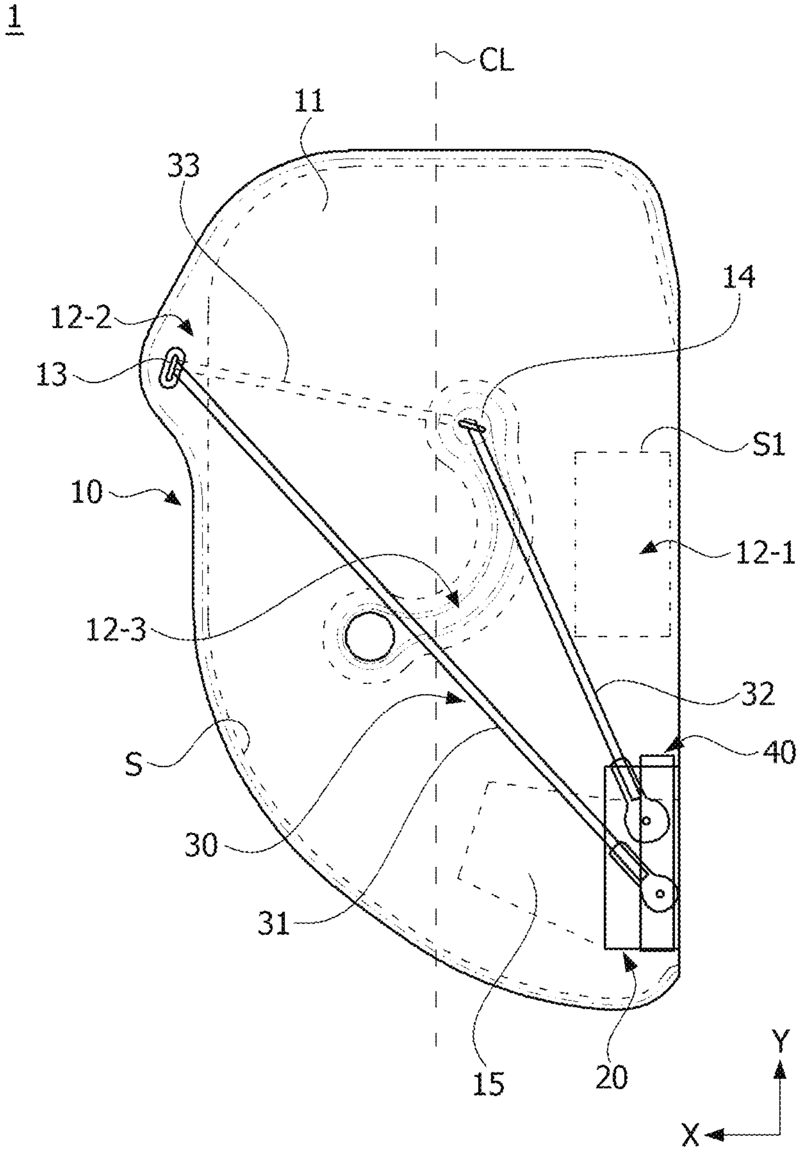

[FIG. 4]
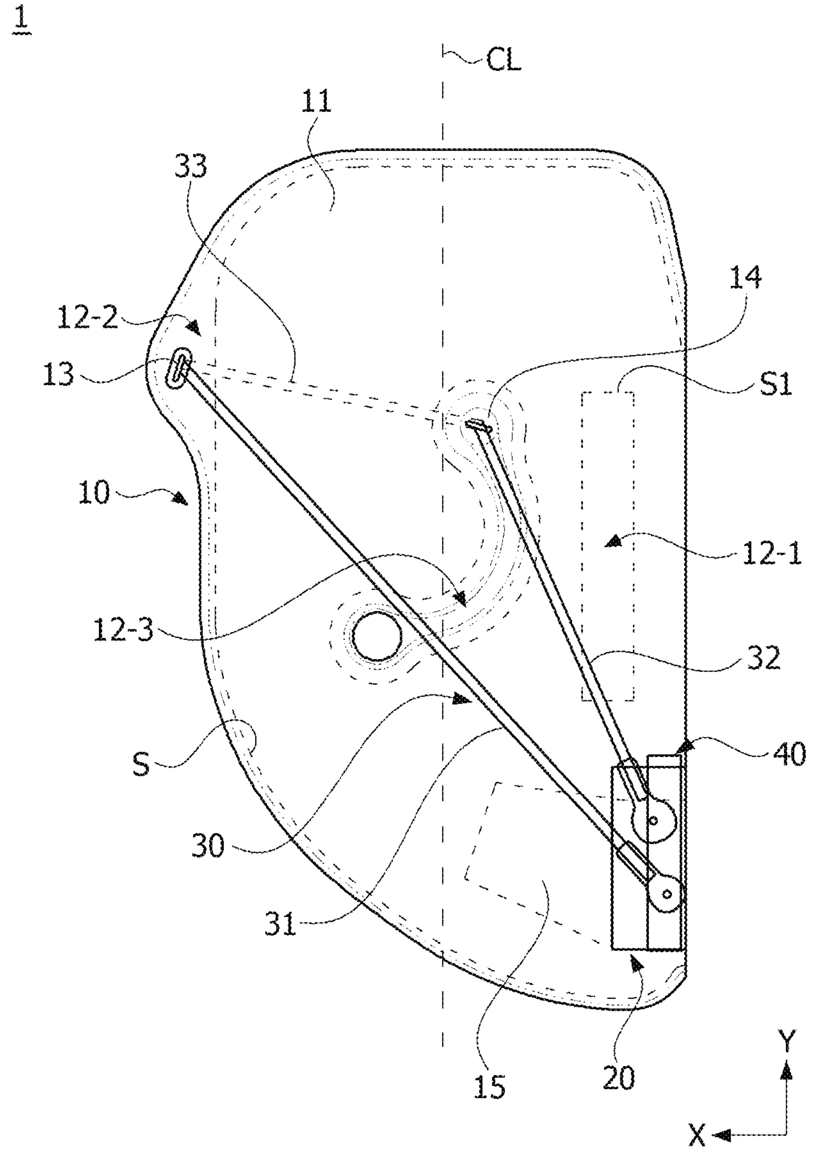

[FIG. 5]
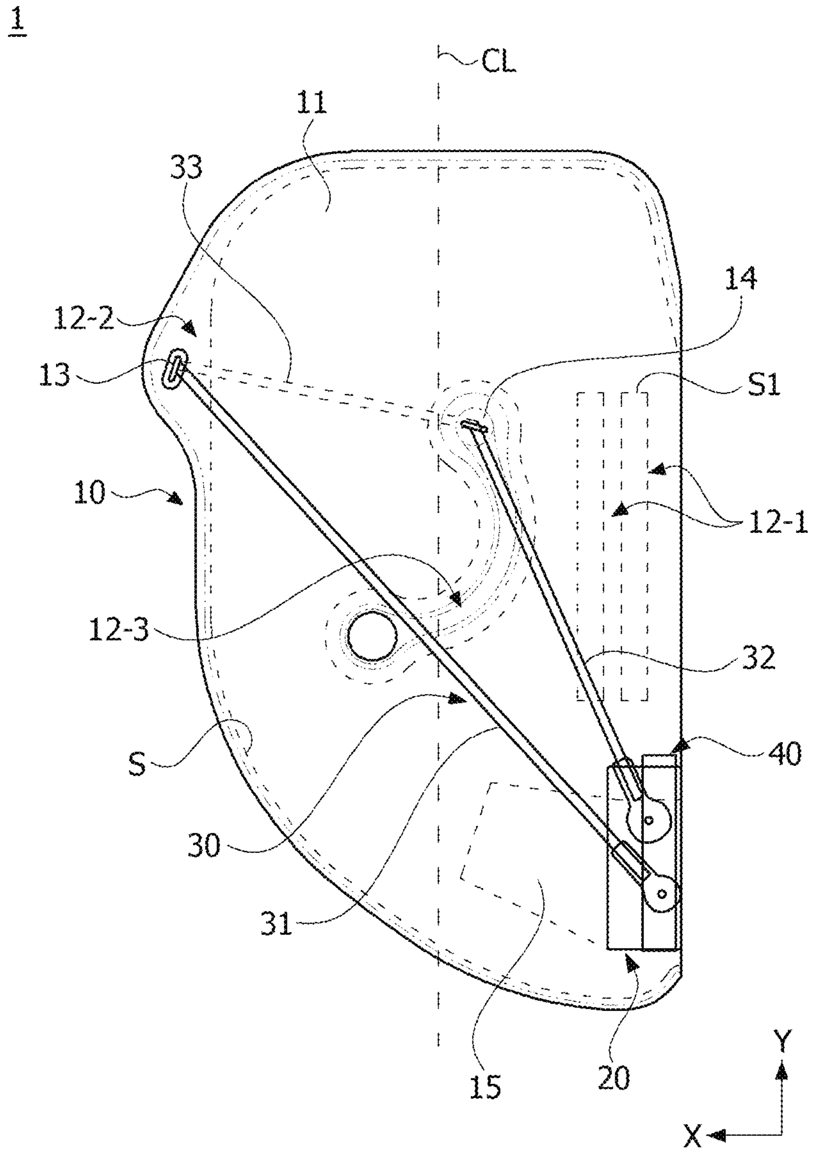

[FIG. 6]
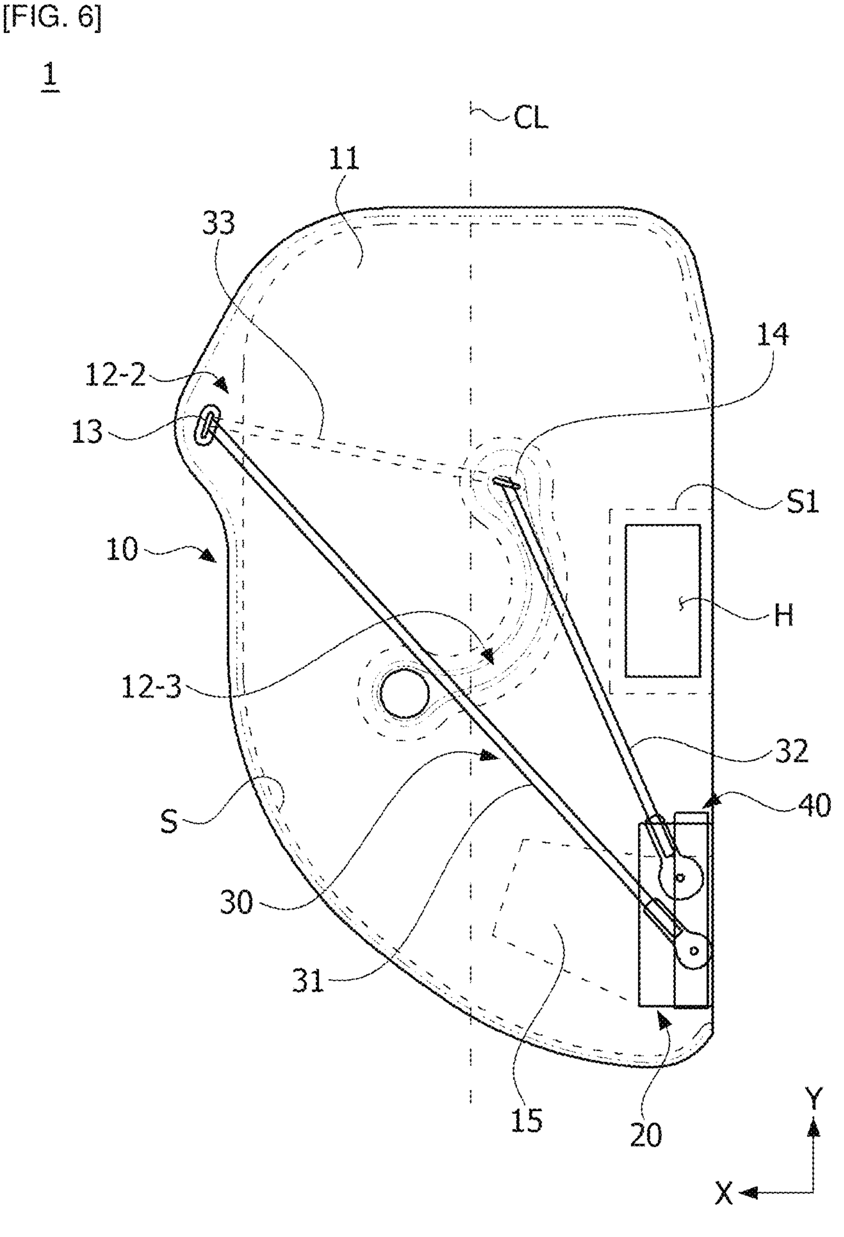

[FIG. 7]
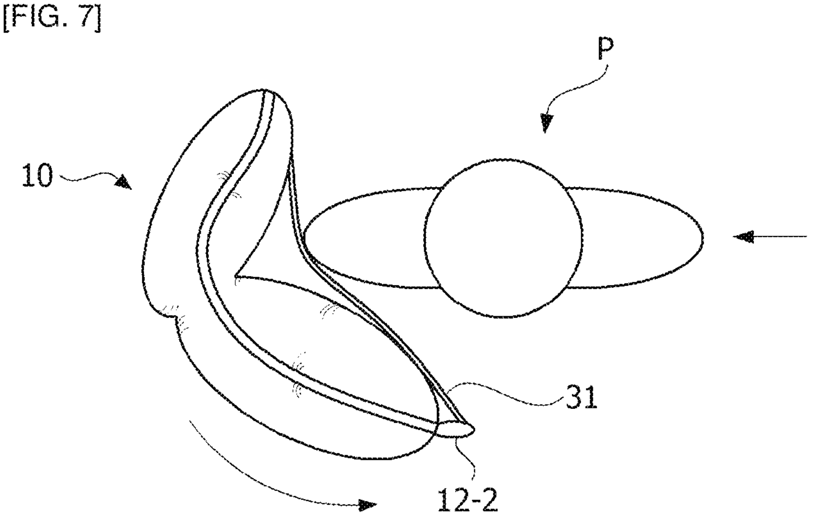
[FIG. 8]
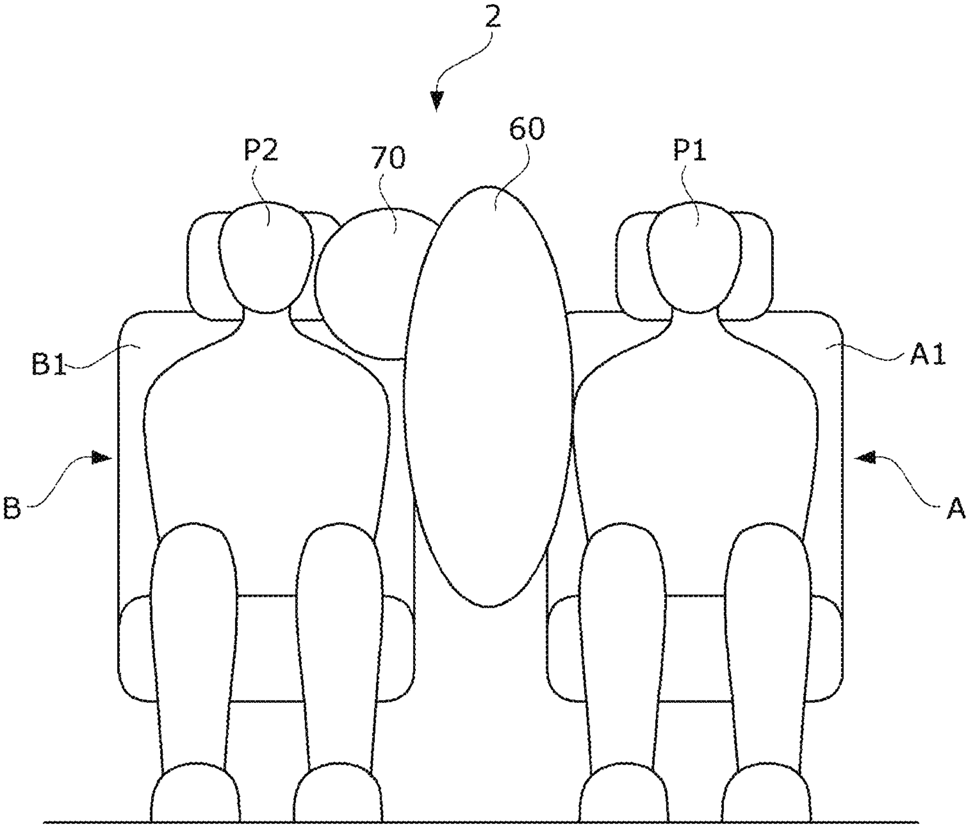

[FIG. 9]
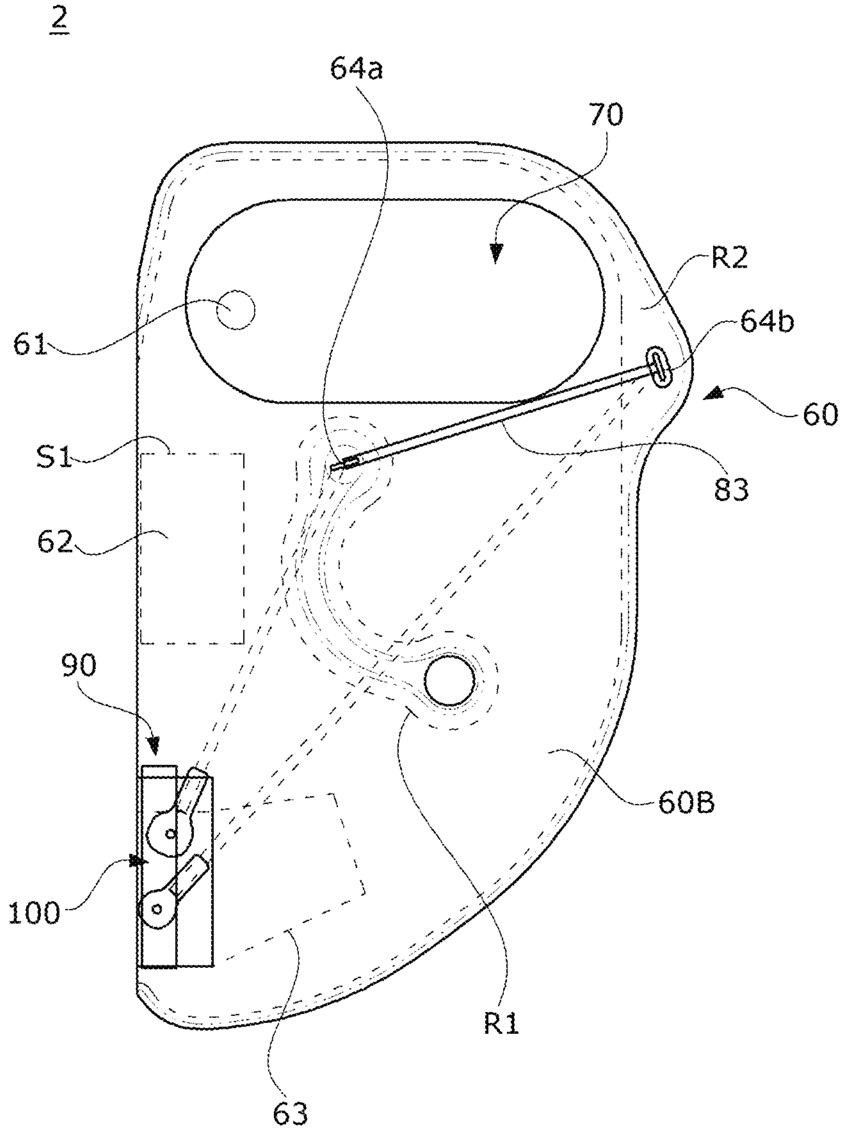

[FIG. 10]
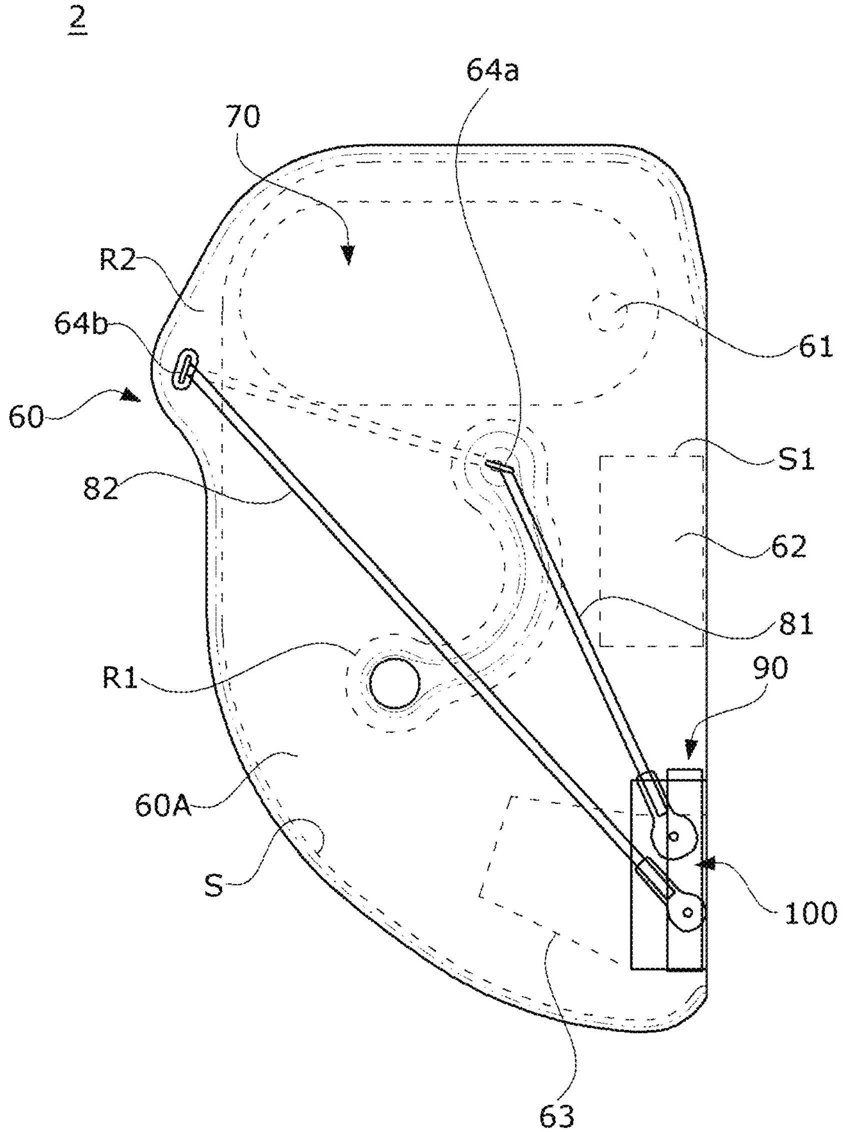

[FIG. 11]
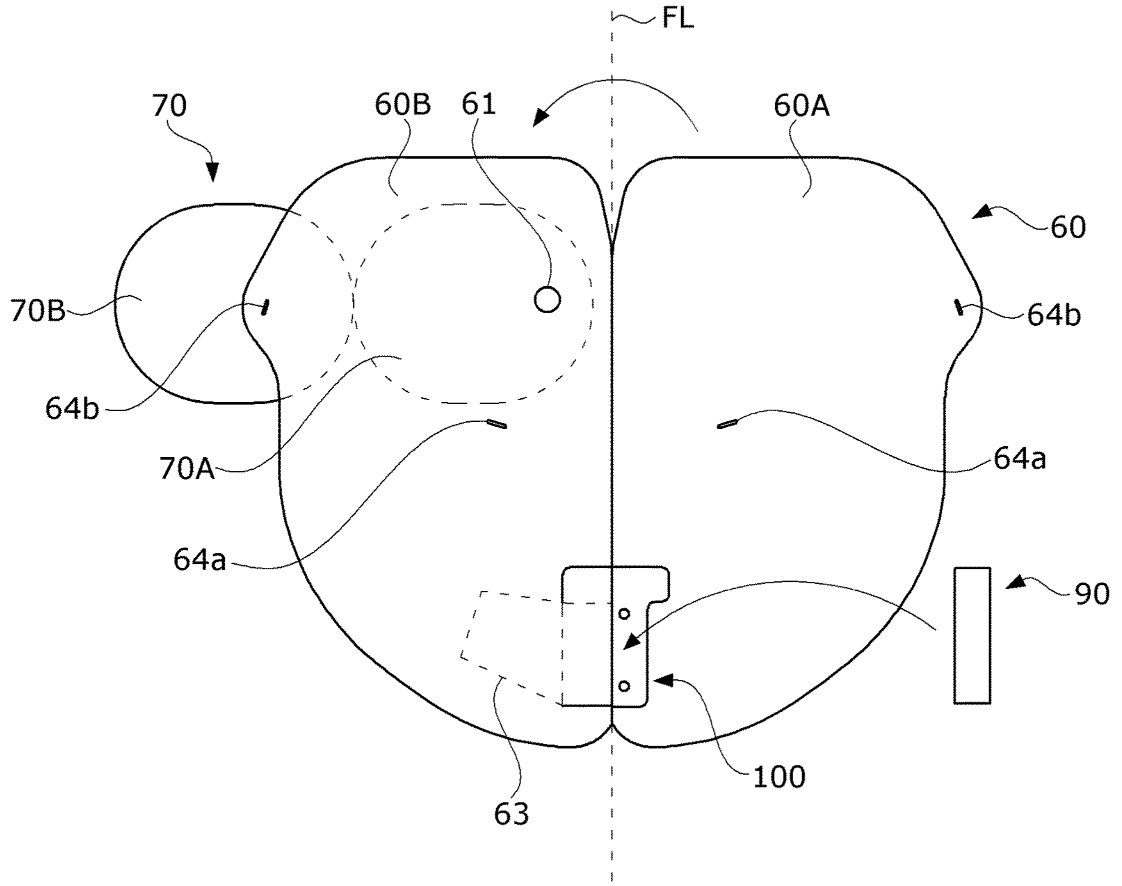
[FIG. 12]
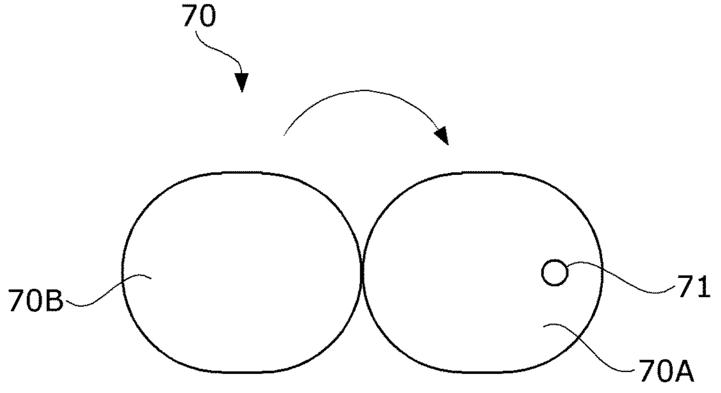

[FIG. 13]
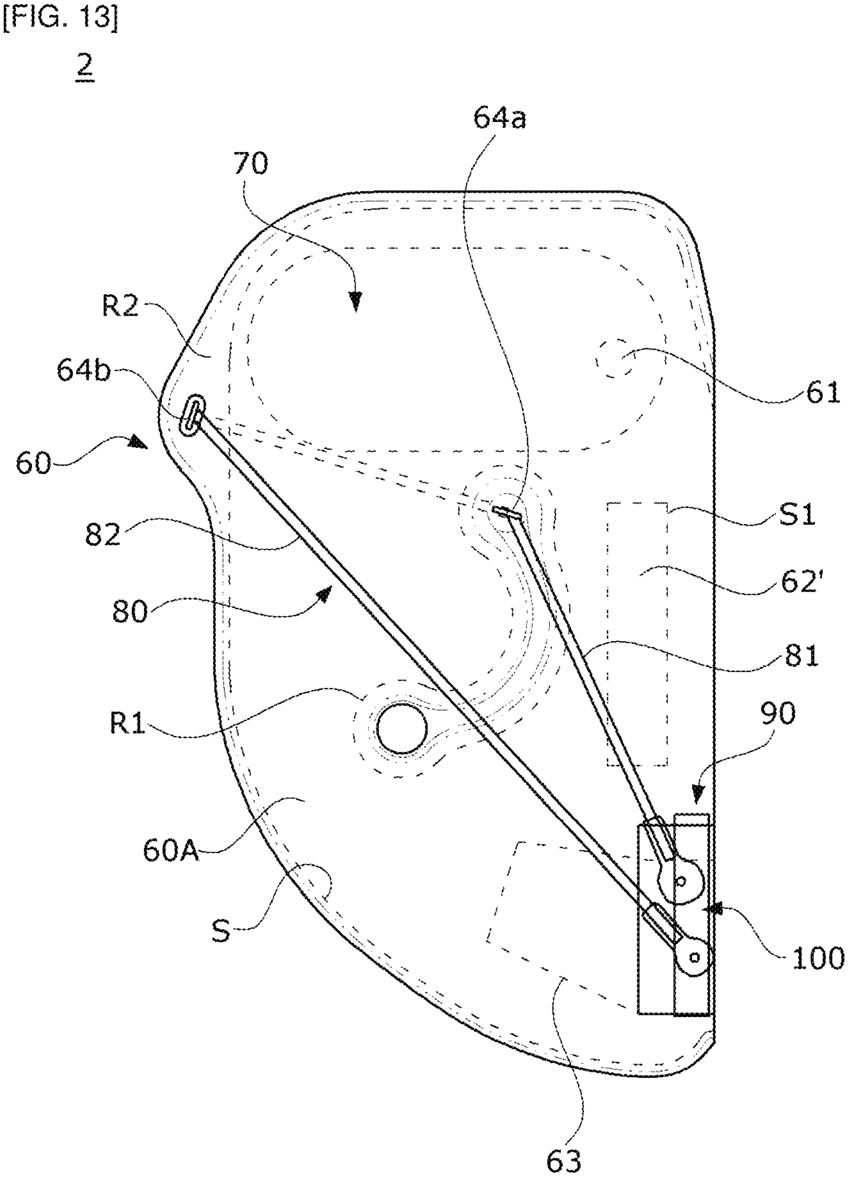

[FIG. 14]
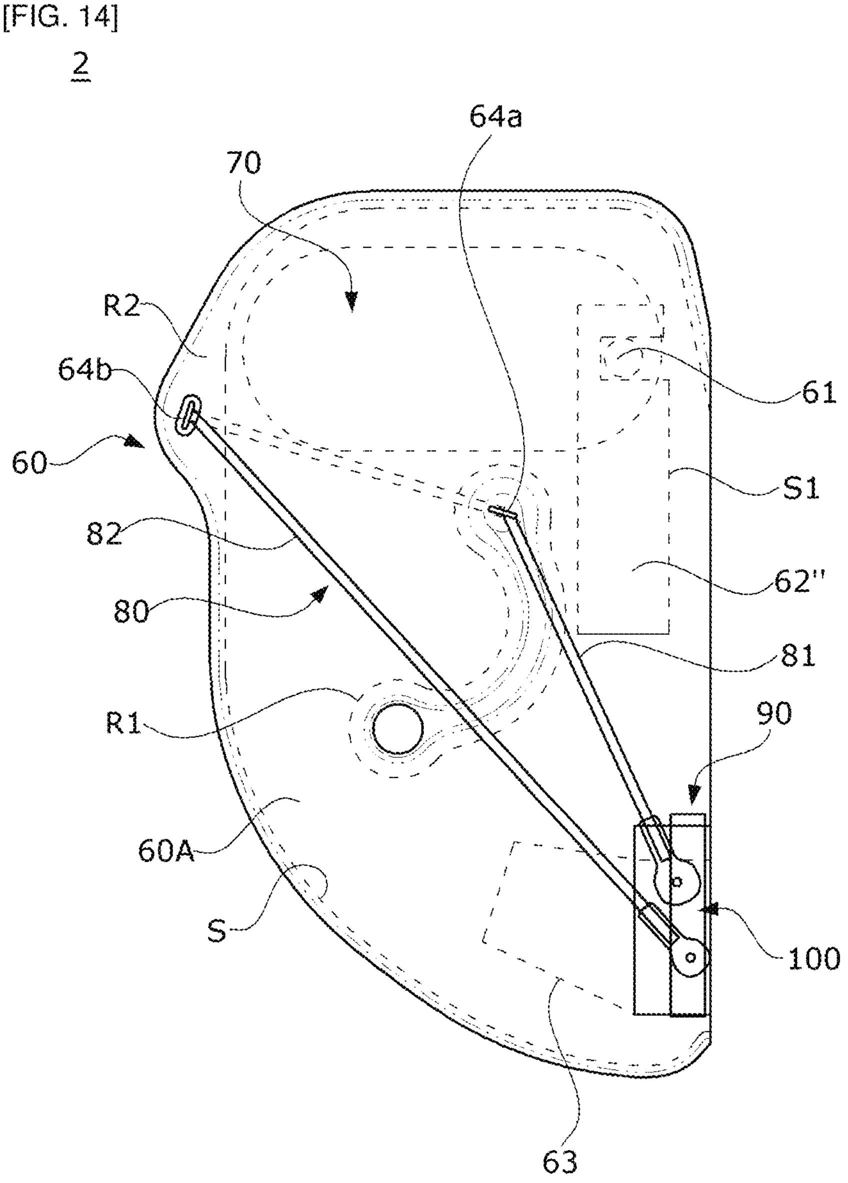

SIDE AIRBAG DEVICE

CROSS-REFERENCE TO RELATED APPLICATION

This application claims priority to and the benefit under 35 USC § 119(a) of Korean Patent Application No. 10-2024-0112485 and Korean Patent Application No. 10-2024-0112486, both filed on Aug. 22, 2024, in the Korean Intellectual Property Office, the entire disclosures of which are incorporated herein by reference in their entireties for all purposes.

BACKGROUND

1. Field of the Invention

The present invention relates to a side airbag device, and more specifically, to a center side airbag device disposed between a driver seat and a passenger seat.

2. Description of the Related Art

In general, various types of airbag devices for protecting passengers when collision accidents occur are provided in vehicles, and among them, a side airbag device is formed to be deployed in a direction in which a side collision occurs to protect a passenger.

Among side airbag devices, a center side airbag device is mounted such that a cushion faces an interior at which a center console of a vehicle is located, and the cushion is deployed between a passenger in a driver seat and a passenger in a passenger seat and serves to restrict the movement of the passenger toward the interior of the vehicle by a recoil of a side collision to protect their head and chest.

However, in a real collision state, when there is no passenger in a passenger seat, since there is no supporting force, a case in which the movement of a passenger in a driver seat cannot be restricted and a cushion is collapsed due to the lateral movement of the passenger occurs, and thus there is a problem that an effect of protecting the passenger is not achieved.

In addition, as the movement of a passenger is not effectively restricted, a phenomenon in which a cushion rotates and moves in a direction opposite to the passenger occurs, and thus there is a problem that the passenger is moved to a next seat and is not protected. Accordingly, it is required to solve this problem.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure seeks to provide solutions to solve the above-mentioned problems and aims to provide a side airbag device capable of sufficiently restricting a passenger when an airbag cushion is deployed from a seatback.

Technical problems of the present invention are not limited to the aforementioned technical problems, and other technical problems, which are not mentioned above, may be clearly understood by those skilled in the art from the following descriptions.

In a general aspect of the disclosure, a side airbag device for a seatback of a vehicle, includes an airbag cushion for deployment between a driver seat and a passenger seat, and a mount provided in a rear end portion of the airbag cushion and installed in the seatback, wherein the airbag cushion includes one or more inactive regions.

The one or more inactive regions may include a first inactive region provided at a location corresponding to a shoulder of a passenger, a second inactive region protruding forward from a front end portion of the airbag cushion, and a third inactive region provided between the first inactive region and the second inactive region.

The first inactive region may be provided as a structure surrounded by a sewing line along which panels that form the airbag cushion are bonded.

The first inactive region may be provided as a structure in which a plurality of sewing lines along which panels that form the airbag cushion are bonded in a longitudinal direction of the airbag cushion are arrayed to be parallel to a width direction of the airbag cushion.

The first inactive region may be provided as a structure having the shape of an opening passing through panels that form the airbag cushion.

The first inactive region may be provided as a structure extending in an oval shape to allow the shoulder of the passenger and the arm corresponding to a portion from the shoulder to the elbow of the passenger to enter the first inactive region.

The side airbag device may further include a tether which passes through and is connected to the airbag cushion.

The side airbag device may further include a tether hole through which the tether passes formed in each of the second inactive region and the third inactive region.

One end and another end of the tether are rotatably coupled to the mount.

The side airbag device may further include an inflator mounted on the mount and disposed in the airbag cushion.

In another general aspect of the disclosure, a side airbag device includes a main cushion including a flow hole in one side surface of the main cushion, the main cushion being expanded by gas upon deployment, and a sub-cushion attached to the one side surface of the main cushion, and connected to the flow hole, the sub-cushion protruding from the main cushion while being expanded by the gas that is introduced through the flow hole as the main cushion is expanded upon deployment, wherein the main cushion includes one or more bunker zones that are implemented as a structure which is not expanded by the gas upon deployment and is concavely recessed in another side surface of the main cushion.

The one or more bunker zones may be provided at a location corresponding to a shoulder of a passenger and formed to restrict movement of the passenger by allowing the shoulder of the passenger to enter the one or more bunker zones in a state in which the main cushion is expanded.

The one or more bunker zones may be formed to be surrounded by a sewing line along which panels that form the main cushion are bonded.

The one or more bunker zones may be provided as a structure extending in a rectangular shape to allow the shoulder of the passenger and the arm extending from the shoulder to enter the one or more bunker zones.

The one or more bunker zones may be provided in a “C” shape which is open toward a rear end portion of the main cushion.

The flow hole may be located above the one or more bunker zones.

The sub-cushion may be disposed above the one or more bunker zones and formed to come into contact with a head of a passenger facing the one side surface.

The side airbag device may further include a tether which passes through and is connected to the main cushion.

The main cushion may include a tether hole through which the tether passes and which is formed in each of a first inactive portion provided in a center region and a second inactive portion protruding forward from a front end portion of the main cushion.

The side airbag may further include an inflator which is installed on a mount provided in the main cushion and generates the gas upon deployment.

BRIEF DESCRIPTION OF THE DRAWINGS

FIG. 1 is a view illustrating a side airbag device according to an embodiment of the present invention;

FIG. 2 is a view illustrating an airbag cushion in the side airbag device according to the embodiment of the present invention;

FIGS. 3 to 6 are views illustrating various examples of a first inactive region in the side airbag device according to the embodiment of the present invention;

FIG. 7 is a schematic view illustrating the airbag cushion that is pulled by a tether in the side airbag device;

FIG. 8 is a view illustrating a side airbag device according to another embodiment of the present invention;

FIGS. 9 and 10 are views illustrating the side airbag device of FIG. 8 that faces a passenger seat or a driver seat;

FIG. 11 is a view illustrating a main cushion in the side airbag device according to the embodiment of the present invention;

FIG. 12 is a view illustrating a sub-cushion in the side airbag device according to the embodiment of the present invention; and FIGS. 13 and 14 are views illustrating modified examples of a bunker zone in the side airbag device according to the embodiment of the present invention.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIGS. 1 to 7 are views illustrating a side airbag device and components thereof according to an embodiment of the present invention.

A side airbag device 1 according to the embodiment of the present invention, which is installed on a side surface of a seatback (not shown) of a driver seat of a vehicle, may operate to protect a passenger when a collision accident of the vehicle occurs. In this case, the side surface of the seatback in which the side airbag device 1 is mounted may be located to face a passenger seat.

In the present embodiment, it is illustrated that the side airbag device 1 is installed in the seatback of the driver seat, but the present invention is not limited thereto, and the side airbag device 1 may be installed in a seatback of the passenger seat according to the embodiment.

Referring to the drawings, the side airbag device 1 according to the embodiment of the present invention may include an airbag cushion 10 and a mount 20. In addition, a tether 30 and an inflator 40 may be included therein according to the embodiment.

The airbag cushion 10 may be installed in the side surface of the seatback and deployed from the side surface of the seatback toward a gap between the driver seat and the passenger seat while expanded by gas generated in the inflator 40. As the airbag cushion 10 is disposed between the driver seat and the passenger seat, the airbag cushion 10 may absorb a mutual impact between the passenger in the driver seat and the passenger in the passenger seat to protect the passengers.

As in the drawings, the airbag cushion 10 may include an expansion region 11 which is expanded by the gas when deployed and an inactive region 12 which is not expanded by the gas, and the inactive region 12 may be provided as a plurality of inactive regions 12.

The airbag cushion 10 may be installed on a seat frame (not shown) in the seatback on the side surface of the seatback using the mount 20.

The mount 20 may be provided in a rear end portion of the airbag cushion 10 and installed in the seatback. In this case, the mount 20 may be located in a lower portion of the airbag cushion 10.

The inflator 40 may be installed on the mount 20, and the inflator 40 may be disposed in the airbag cushion 10.

The airbag cushion 10 may include a first panel 10A facing the driver seat and a second panel 10B facing the passenger seat. Each of the first panel 10A and the second panel 10B may be formed of a flexible woven material but neither is limited thereto.

The airbag cushion 10 may have a single panel structure in which the first panel 10A and the second panel 10B are left-right symmetrical with respect to a central folding line FL and are connected to each other. In addition, in a state in which the first panel 10A and the second panel 10B are folded along the folding line FL and overlap, an edge of the first panel 10A and an edge of the second panel 10B may be sewed along an edge sewing line S to form the airbag cushion 10.

In the present embodiment, it is illustrated that the airbag cushion 10 is provided as the single panel structure in which the first panel 10A and the second panel 10B are integrally connected, but the present invention is not limited thereto.

For example, in a state in which the individually cut and separately provided first panel 10A and second panel 10B overlap, the edge of the first panel 10A and the edge of the second panel 10B, which are in contact with each other, may be sewed to form the airbag cushion 10.

In the embodiment, a strap 15 for fixedly roll-folding the airbag cushion 10 to an outer surface may be provided on any one side of a first panel 21 and a second panel 22.

The strap 15 serves to surround a circumference of the airbag cushion 10, which is roll-folded to be installed in the seatback, to restrict unfolding of the airbag cushion 10. In addition, the strap 15 may be formed to be ruptured when the airbag cushion 10 is expanded.

The airbag cushion 10 may include a first inactive region 12-1, a second inactive region 12-2, and a third inactive region 12-3.

The first inactive region 12-1 may be provided at a location corresponding to a shoulder of the passenger and may vertically extend in a longitudinal direction (Y-axis direction) of the airbag cushion 10. When a collision accident occurs, the shoulder of the passenger enters the first inactive region 12-1 and is caught therein, a tensile force is applied in a direction opposite to a direction in which the shoulder pushes due to inertia in the first inactive region 12-1 to restrict the passenger and limit a movement extent of the passenger. Accordingly, a conventional phenomenon in which the movement of a passenger is not effectively restricted and an airbag cushion is rotated and moved in a direction opposite to the passenger can be prevented from occurring, and thus a restriction force for the passenger can be increased.

The first inactive region 12-1 may be located in a rear portion based on a vertical center line CL bisecting the airbag cushion 10 in a width direction (X-axis direction). In the embodiment, the first inactive region 12-1 may be located in a rear portion of the airbag cushion 10 and above the mount 20.

The first inactive region 12-1 may be provided as a structure surrounded by a sewing line S1 along which the panels 10A and 10B constituting the airbag cushion 10 are bonded.

The first inactive region 12-1 may be located in the rear end portion corresponding to the folding line FL of the airbag cushion 10, or in an inner side spaced apart from the rear end portion of the airbag cushion 10 as in FIG. 3.

In addition, as in FIG. 4, the first inactive region 12-1 may be provided as a long structure extending in an oval shape to allow the shoulder of the passenger and the arm corresponding to the portion from the shoulder to the elbow of the passenger to enter the first inactive region 12-1. Accordingly, a restriction force of the passenger can be further increased.

In addition, as in FIG. 5, the first inactive region 12-1 may be provided as a structure in which a plurality of sewing lines S1, along which the panels 10A and 10B constituting the airbag cushion 10 are bonded in the longitudinal direction of the airbag cushion 10, are arrayed to be parallel to the width direction of the airbag cushion 10.

In the present embodiment, it is illustrated that the sewing line S1 for forming the first inactive region 12-1 is provided as two sewing lines S1, but the present invention is not limited thereto, and according to the embodiment, the sewing line S1 may be provided as two sewing lines S1 or more. In this case, lengths, thicknesses, a distance, and the like of the sewing lines S1 may be variously changed.

As in FIG. 6, the first inactive region 12-1 may be provided as a structure having the shape of an opening passing through the panels 10A and 10B constituting the airbag cushion 10. That is, as a hole H is formed in the panels 10A and 10B to correspond to a size of the first inactive region 12-1, and sewing is performed along a circumference of the hole H, the first inactive region 12-1 passing through the airbag cushion 10 may be implemented.

Meanwhile, the second inactive region 12-2 may be provided as a structure protruding forward from a front end portion of the airbag cushion 10.

The second inactive region 12-2 may be located in a front portion based on the vertical center line CL and disposed outside the edge sewing line S to prevent the gas from being introduced thereinto.

A first tether hole 13 through which the tether 30 passes and to which the tether 30 is connected may be formed in the second inactive region 12-2.

The third inactive region 12-3 may be provided between the first inactive region 12-1 and the second inactive region 12-2.

The third inactive region 12-3 may be disposed as a structure which crosses and passes through the vertical center line CL and substantially curvedly extends from an upper rear side to a lower front side of the airbag cushion 10.

The third inactive region 12-3 may serve to restrict an expansion thickness of the airbag cushion 10 and serve as a bending reference which allows the airbag cushion 10 to be partially bent from the third inactive region 12-3 toward the seatback in conjunction with the tether 30 which will be described below.

A second tether hole 14 through which the tether 30 passes and to which the tether 30 is connected may be formed in the third inactive region 12-3.

The tether 30 may pass through the airbag cushion 10 and may be connected to the airbag cushion 10.

One end of the tether 30 may be rotatably coupled to the mount 20, the tether 30 may pass through and be connected to the first tether hole 13 and the second tether hole 14, and the other end thereof may be rotatably coupled to the mount 20. Accordingly, the tether 30 may rotate to correspond to a shape of the airbag cushion 10 changed while expanded, and a position at which the tether 30 supports the airbag cushion 10 can be adjusted.

A first section 31 between one end of the tether 30 and the first tether hole 13 and a second section 32 between the other end of the tether 30 and the second tether hole 14 may be disposed to be exposed to the outside of the first panel 10A (toward the driver seat), and a third section 33 between the first tether hole 13 and the second tether hole 14 may be disposed to be exposed to the outside of the second panel 10B (toward the passenger seat).

Through this structure, when the airbag cushion 10 is deployed, as the first section 31 and the second section 32 pull the third section 33 to support the front end portion of the airbag cushion 10, the front end portion of the airbag cushion 10 is prevented from rotating toward the passenger seat.

Particularly, referring to FIG. 7, as the first section 31 and the second section 32 are disposed on a path to cross the airbag cushion 10 at locations facing the passenger in the driver seat P, the first section 31 and the second section 32 are pressed toward the airbag cushion 10 due to the movement of the passenger P in the driver seat. Accordingly, as a tensile force applied to the first section 31 increases, the front end portion of the airbag cushion 10 is more reliably pulled and bent toward the seatback. Accordingly, the passenger in the driver seat P can be more reliably restricted.

In the present embodiment, since the first tether hole 13 is formed in the second inactive region 12-2 separated from the expansion region 11, in a state in which the airbag cushion 10 is expanded by a deploying pressure, even when a large tensile force is applied to the third section 33 by the first section 31, the large tensile force does not affect the airbag cushion 10 constituting the expansion region 11.

The inflator 40 may be mounted on the mount 20 and disposed in the airbag cushion 10.

The inflator 40 may generate the gas according to a signal transmitted from an airbag control unit (ACU) which is not shown.

A gas generation agent and an ignition unit may be embedded in the inflator 40. In the embodiment, the inflator 40 may be provided as a cylinder type inflator including a discharge port for discharging the gas in one end portion thereof.

As described above, in the side airbag device 1 according to the embodiment of the present invention, when a collision accident of the vehicle occurs, the front end portion is deformed to be bent along the third inactive region 12-3 toward the seatback to restrict the passenger (driver) by surrounding the passenger (driver) from a body to a head while the airbag cushion 10 is expanded and deployed.

Accordingly, a conventional case in which, since a side airbag device does not have a supporting force, the movement of a passenger in a driver seat cannot be restricted and the side airbag device collapses due to the lateral movement of the passenger, and a problem due to a phenomenon in which a cushion rotates between the passenger in the driver seat and the passenger in the passenger seat and a position of the cushion is freely changed do not occur.

Particularly, as the first inactive region 12-1 is provided at the location corresponding to the shoulder of the passenger, the shoulder of the passenger enters and is caught in the first inactive region 12-1 to restrict the movement of the passenger, and thus the passenger can be more stably protected, minimizing injury.

FIGS. 8 to 14 are views illustrating a side airbag device and components thereof according to another embodiment of the present invention.

A side airbag device 2 according to the embodiment of the present invention may be mounted on a side surface of a seatback A1 of a driver seat A of a vehicle and may protect a passenger when a collision accident of the vehicle occurs. However, the side airbag device 2 according to the embodiment may also be mounted on a side surface of a seatback B1 of a passenger seat B. In the present invention, it will be described that the side airbag device 2 is mounted on the seatback A1 of the driver seat A.

Referring to the drawings, the side airbag device 2 according to the embodiment of the present invention may include a main cushion 60 and a sub-cushion 70. In addition, a tether 80 and an inflator 90 may be further included therein according to the embodiment.

The main cushion 60 may include a flow hole 61 formed to pass through one side surface thereof and may be expanded by gas. In the embodiment, the main cushion 60 may be installed on the side surface of seatback A1 of the driver seat, expanded by the gas generated in the inflator 90, and deployed between the driver seat A and the passenger seat B. In addition, the main cushion 10 is disposed between the driver seat A and the passenger seat B to protect a passenger P1 in the driver seat A or protect passengers by preventing the passenger P1 in the driver seat A and a passenger P2 in the passenger seat B from colliding with each other.

The main cushion 60 may be installed on a frame (not shown) in the seatback A1 on the side surface of the seatback A1 using a mount 100.

The mount 100 may be provided in a rear end portion of the main cushion 60 and installed in the seatback A1. In this case, the mount 100 may be located in a lower portion of the main cushion 60.

The inflator 90 may be mounted on the mount 100, and the inflator 90 may be disposed in the main cushion 60.

The main cushion 60 may include a first panel 60A facing the driver seat A and a second panel 60B facing the passenger seat B. Each of the first panel 60A and the second panel 60B may be formed of a flexible woven material but neither is limited thereto.

As in FIG. 11, the main cushion 60 may have a single panel structure in which the first panel 60A and the second panel 60B are left-right symmetrical with respect to a central folding line FL and are connected to each other. In addition, in a state in which the first panel 10A and the second panel 10B are folded along the folding line FL and overlap, an edge of the first panel 10A and an edge of the second panel 10B may be sewed along an edge sewing line S to form the main cushion 10.

In the present embodiment, it is illustrated that the main cushion 10 is provided as the single panel structure in which the first panel 10A and the second panel 10B are integrally connected, but the present invention is not limited thereto. For example, the first panel 60A and the second panel 60B may be individually cut and separately provided.

The flow hole 61 may be formed in the second panel 60B as a structure passing through the second panel 60B facing the passenger seat B.

The main cushion 60 may include a bunker zone 62 implemented as a structure which is not expanded by the gas and is concavely recessed in the other side surface opposite to one side surface in which the flow hole 61 is formed. That is, the bunker zone 62 may be provided in the first panel 60A facing the driver seat A.

The bunker zone 62 may be provided at a location corresponding to a shoulder of a passenger and formed to restrict the passenger P1 by allowing the shoulder of the passenger P1 to enter the bunker zone in a state in which the main cushion 60 is expanded. That is, when a collision accident occurs, as the shoulder of the passenger P1 enters and is caught in the concave bunker zone 62 and the passenger P1 is restricted in a direction opposite to the direction in which the shoulder pushes due to inertia in the bunker zone 62, the movement of the passenger P1 is limited. Accordingly, a conventional case in which, since the movement of a passenger is not effectively restricted, an airbag cushion rotates and moves in a direction opposite to the passenger can be prevented from occurring, and thus a restriction force for the passenger can be increased.

The bunker zone 62 may be formed to be surrounded by a sewing line S1 along which first and second panels 60A and 60B constituting the main cushion 60 are bonded. In addition, the flow hole 61 may be located above the bunker zone 62 to be spaced upward from the bunker zone 62.

In the embodiment, as in FIG. 13, a bunker zone 62' may be provided as a structure that extends in a rectangular shape to allow a shoulder of a passenger P1 and the arm extending from the shoulder to enter. Accordingly, a restriction force of the passenger can be further increased.

In addition, as in FIG. 14, a bunker zone 62" may be provided as a structure having substantially a "C" shape, which is open toward a rear end portion of a main cushion. Due to the shape of the bunker zone 62", a shoulder of a passenger P1 can be more effectively restricted at a front side of the shoulder of the passenger P1, so that the movement of the passenger P1 can be more strongly blocked. In this case, a flow hole 61 may be located in an inner region surrounded by the bunker zone 62". However, the flow hole 61 may also. be located in an upper region outside the bunker zone 62".

In the embodiment, a strap 63 for fixedly roll-folding the main cushion 60 to an outer surface may be provided on any one side of the first panel 60A and the second panel 60B.

The strap 63 serves to restrict unfolding of the main cushion 60 by surrounding a circumference of the main cushion 60 in a state in which the main cushion 60 is roll-folded to be mounted in the seatback A1. In addition, the strap 63 may be formed to be ruptured when the main cushion 60 is expanded.

The sub-cushion 70 may be provided as a structure attached to one side surface of the main cushion 60 and connected to the flow hole 61.

The sub-cushion 70 may be formed to be expanded by the gas introduced through the flow hole 61 as the main cushion 60 is expanded and to protrude outward from the main cushion 60. In the embodiment, the sub-cushion 70 may protrude from the second panel 60B of the main cushion 60 toward the passenger seat B. The sub-cushion 70 may be disposed above the bunker zone 62.

Accordingly, the sub-cushion 70 may be formed to come into contact with a head of the passenger P2 in the passenger seat B facing one side surface of the main cushion 60 to support the main cushion 60, secure an impact absorption space, and support the head of the passenger P2 in the passenger seat B to prevent occurrence of injury.

In addition, when there is no passenger P2 in the passenger seat B, a support structure in which a protruding front end of the sub-cushion 70 comes into contact with the seatback B1 of the passenger seat B to support the main cushion 60 may be implemented.

As in FIGS. 11 and 12, two panels 70A and 70B, which are cut in predetermined shapes, are in contact with each other in a flat state, and edges of circumferences thereof are sewed to form the sub-cushion 70. In this case, the sub-cushion 70 may be formed to have a volume which is relatively smaller than that of the main cushion 60.

Each of the panels 70A and 70B may be formed of a flexible woven material but neither is limited thereto.

Among the panels 70A and 70B constituting the sub-cushion 70, a connection hole 71 may be formed in the panel 70A bonded to the second panel 60B of the main cushion 60. The connection hole 71 may overlap and may be connected to the flow hole 61 when the panel 70A of the sub-cushion 70 is bonded to the second panel 60B.

In the embodiment, the panel 70A in which the connection hole 71 is formed and the second panel 60B of the main cushion 60 may be in contact with each other and may be sewed along circumferences thereof in a state in which the connection hole 71 and the flow hole 61 overlap to couple the sub-cushion 70 to the main cushion 60.

The tether 80 may pass through and may be connected to the main cushion 60. To this end, the main cushion 60 may include a tether hole 64 through which the tether 80 passes.

In the embodiment, the tether hole 64 may include a first tether hole 64*a* formed in a first inactive portion R1 provided in a center region of the main cushion 60 and a second tether hole 64*b* formed in a second inactive portion R2 protruding forward from a front end portion of the main cushion 60.

One end of the tether 80 may be rotatably coupled to the mount 100, the tether 80 may pass through and be connected to the first tether hole 64*a* and the second tether hole 64*b*, and the other end thereof may be rotatably coupled to the mount 100. Accordingly, the tether 80 may rotate to correspond to a change in shape of the main cushion 60 as the main cushion 60 expands, and a position at which the tether 80 supports the main cushion 60 can be adjusted.

A first section 81 between one end of the tether 80 and the first tether hole 64*a* and a second section 82 between the other end of the tether 80 and the second tether hole 64*b* may be disposed to be exposed toward the driver seat A which is the outside of the first panel 60A, and a third section 83 between the first tether hole 64*a* and the second tether hole 64*b* may be disposed to be exposed toward the passenger seat B which is the outside of the second panel 60B. In this case, the third section 83 may be disposed under the sub-cushion 70. Accordingly, the sub-cushion 70 may expand without interference with the third section 83.

Through the above-described structure, when the main cushion 60 is deployed, the first section 81 and the second section 82 pull the third section 83 to support the front end portion of the main cushion 60 and prevent the front end portion of the main cushion 60 from rotating toward the passenger seat B.

Particularly, as the first section 81 and the second section 82 are disposed on a path crossing the main cushion 60 at locations facing the passenger P1 in the driver seat A, the first section 81 and the second section 82 are pressed toward the main cushion 60 due to the movement of the passenger P1 in the driver seat A, and accordingly, as a tensile force applied to the first section 81 increases, the front end portion of the main cushion 60 is more reliably pulled and bent toward the seatback A1. Accordingly, the passenger P1 in the driver seat A can be more reliably restricted.

The inflator 90 may be mounted on the mount 100 and disposed in the main cushion 60.

The inflator 90 may generate the gas according to a signal transmitted from an ACU which is not shown.

A gas generation agent and an ignition unit may be embedded in the inflator 90. In the embodiment, the inflator 90 may be provided as a cylinder type inflator including a discharge port for discharging the gas in one end portion thereof.

As described above, in the side airbag device 2 according to the embodiment of the present invention, when a collision accident of the vehicle occurs, the front end portion is deformed to be bent toward the seatback A1 and restrict the passenger P1 in the driver seat A by surrounding the passenger P1 from a body to a head while the main cushion 60 is expanded and deployed.

Accordingly, a conventional case in which, since a side airbag device does not have a supporting force, the movement of a passenger in a driver seat cannot be restricted and the side airbag device is collapsed due to the lateral movement of the passenger, and a problem due to a phenomenon in which a cushion rotates between the passenger in the driver seat and a passenger in a passenger seat and a position of the cushion is freely changed do not occur.

Particularly, as the bunker zone 62 having the concavely recessed structure is provided at the location corresponding to the shoulder of the passenger P1, the shoulder of the passenger P1 enters and is caught in the bunker zone 62 to restrict the movement of the passenger P1, the passenger P1 can be more stably protected, minimizing injury.

In addition, as the sub-cushion 70 deployed from the main cushion 60 toward the passenger seat B supports the head of the passenger P2 in the passenger seat B, occurrence of injury can be prevented.

According to embodiments of the present invention, a side airbag device capable of sufficiently restricting a passenger when an airbag cushion is deployed from a seatback can be provided.

Effects of the present invention are not limited to the above-described effects, and other objects which are not described above will be clearly understood by those skilled in the art from the appended claims.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A side airbag device configured to be disposed between a driver seat and a passenger seat, the side airbag device comprising:

a main cushion including:

a flow hole in one side surface of the main cushion, the main cushion being expanded by gas upon deployment of the side airbag device; and a sub-cushion attached to the one side surface of the main cushion, and connected to the flow hole, wherein the sub-cushion protrudes from the main cushion while being expanded by the gas that is introduced through the flow hole as the main cushion is expanded upon deployment of the side airbag device, wherein the main cushion includes a bunker zone implemented as a structure that is not expanded by the gas upon deployment and is concavely recessed in another side surface of the main cushion, wherein the bunker zone is provided in a "C" shape which is open toward a rear end portion of the main cushion, and wherein the flow hole is located in an inner region surrounded by the bunker zone.

2. The side airbag device of claim 1, wherein the bunker zone is provided at a location configured to correspond to a shoulder of a driver and formed to restrict movement of the driver by being configured to allow the shoulder of the driver to enter the bunker zone in a state in which the main cushion is expanded.

3. The side airbag device of claim 2, wherein the bunker zone is formed to be surrounded by a sewing line along which panels that form the main cushion are bonded.

4. The side airbag device of claim 2, wherein the bunker zone is provided as a structure extending downwardly in a rectangular shape below the flow hole and configured to allow the shoulder of the driver and the arm extending from the shoulder to enter the bunker zone.

5. The side airbag device of claim 1, wherein the sub-cushion is disposed above the bunker zone and configured to be formed to come into contact with a head of a passenger facing the one side surface.

6. The side airbag device of claim 1, further comprising a tether which passes through and is connected to the main cushion.

7. The side airbag device of claim 6, wherein the main cushion includes a tether hole through which the tether passes and which is formed in each of a first inactive portion provided in a center region and a second inactive portion protruding forwardly from a front end portion of the main cushion.

8. The side airbag device of claim 1, further comprising an inflator which is installed on a mount provided in the main cushion and generates the gas upon deployment of the side airbag device.

* * * * *